Figure 1:
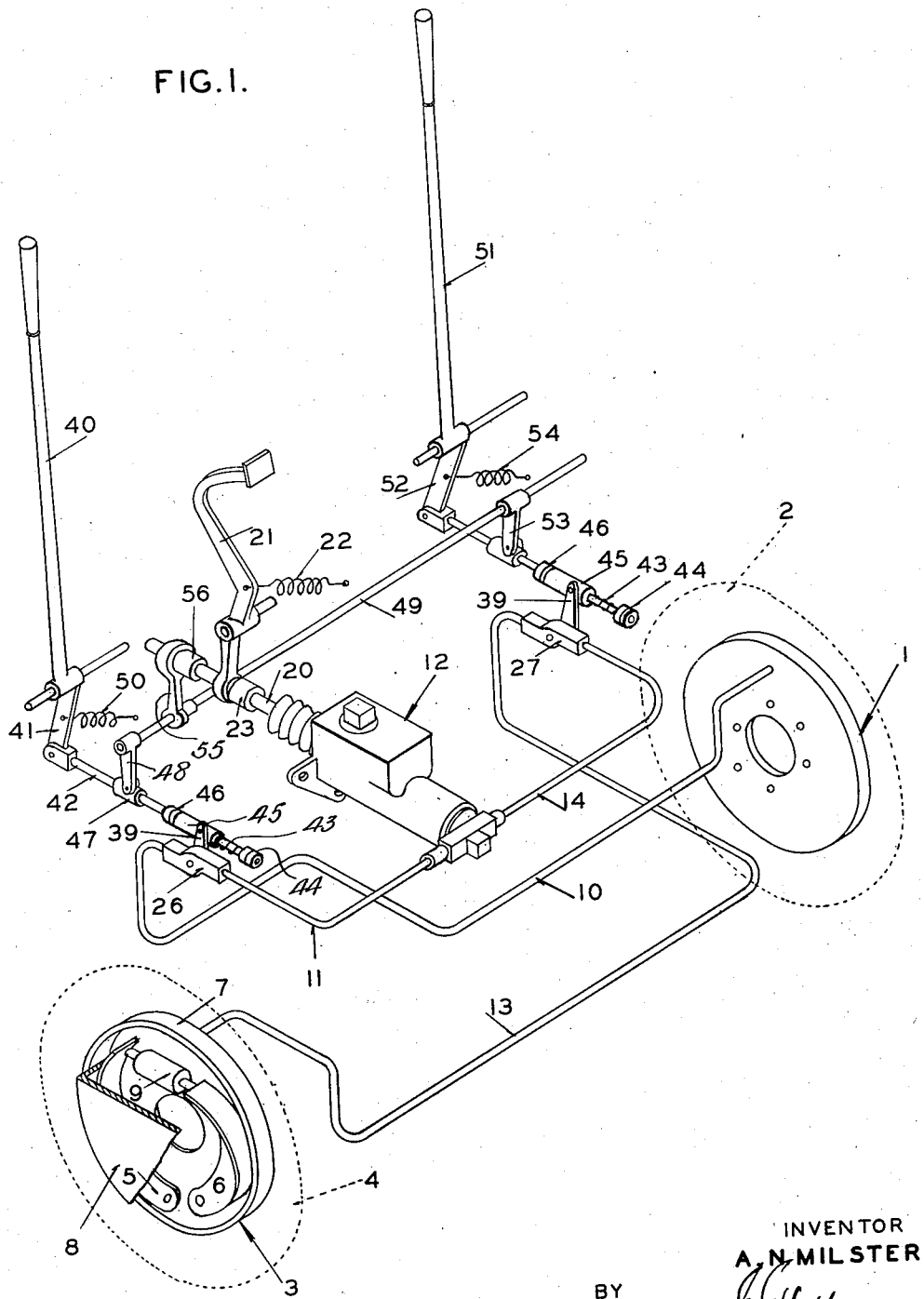

May 6, 1941.  A. N. MILSTER  2,241,214
BRAKING SYSTEM FOR ASSISTING IN STEERING
Filed Feb. 15, 1940   2 Sheets—Sheet 1

INVENTOR
A. N. MILSTER
BY
ATTORNEY

May 6, 1941.  A. N. MILSTER  2,241,214
BRAKING SYSTEM FOR ASSISTING IN STEERING
Filed Feb. 15, 1940  2 Sheets-Sheet 2
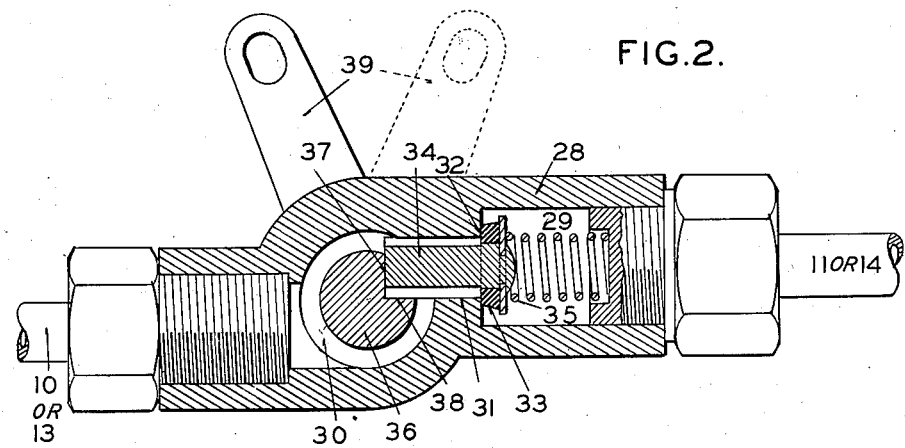
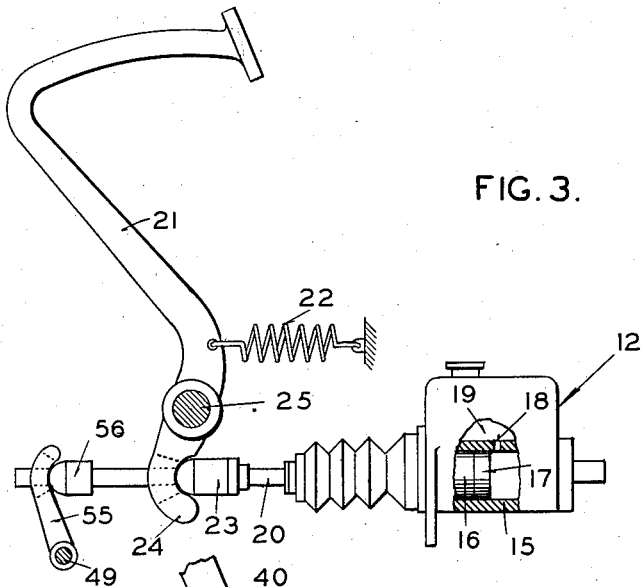
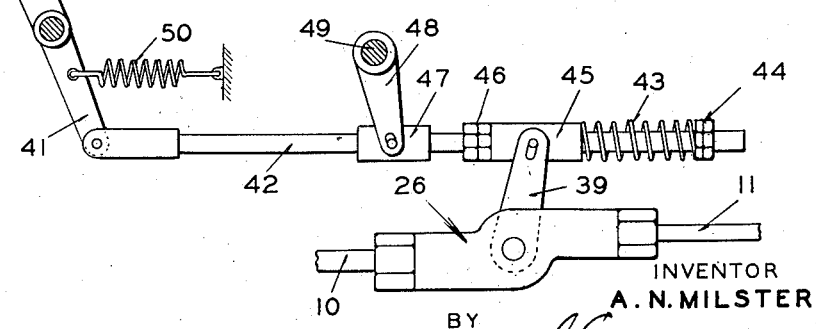
INVENTOR
A. N. MILSTER
BY
ATTORNEY Patented May 6, 1941

2,241,214

UNITED STATES PATENT OFFICE 2,241,214

BRAKING SYSTEM FOR ASSISTING IN STEERING

Arthur N. Milster, Ferguson, Mo., assignor to Wagner Electric Corporation, St. Louis, Mo., a corporation of Delaware Application February 15, 1940, Serial No. 318,981

11 Claims. (Cl. 188—152)

My invention relates to a fluid pressure actuated braking systems and more particularly to a system which will permit two brakes to be applied simultaneously or individually.

One of the objects of my invention is to produce an improved fluid pressure actuated braking system which will permit two brakes to be applied either simultaneously or individually by a single pressure producing device.

Still another object is to produce an improved brake actuating system for the brakes of two wheels of a vehicle which can be so controlled by the operator that the brakes can be employed to assist in steering.

Other objects of my invention will become apparent from the following description taken in connection with the accompanying drawings in which Figure 1 is a view of a fluid pressure actuated braking system embodying my invention; Figure 2 is an enlarged sectional view of one of the control valves; Figure 3 is a side view showing the control connections between the cross shaft and the master cylinder and between the brake pedal and the master cylinder; and Figure 4 is a side view showing the connections between one of the hand levers, the cross shaft and the associated control valve.

Referring to the drawings in detail and particularly Figure 1, there is shown a right-hand braking assembly 1 for braking a wheel 2 and a left-hand braking assembly 3 for braking a wheel 4. Each of these braking assemblies comprises pivoted shoes 5 and 6 mounted on a backing plate 7 and adapted to be actuated into engagement with a drum 8 by means of a fluid motor 9. The fluid motor of the right-hand brake is connected by conduits 10 and 11 to a master cylinder device 12 and the fluid motor of the left-hand brake is connected to this same master cylinder by conduits 13 and 14.

The master cylinder device, as best shown in Figure 3, is of the usual construction and comprises a cylinder 15 in which is reciprocable a pressure producing piston 16. A sealing cup 17 is associated with the head of the piston and when the piston and cup are in their normally retracted position they uncover a porthole 18 for placing the cylinder and the braking system in communication with a reservoir 19 to thus permit contraction and expansion of the fluid. The piston of the master cylinder is adapted to be actuated by a piston rod 20 and a brake pedal 21, the latter being held in its normally inoperative position by a spring 22. The connection between the pedal and the piston rod is such as to permit the piston rod to be moved to actuate the piston independently of the brake pedal and as shown comprises a collar 23 fixed to the piston rod and capable of being abutted by the end 24 of the pedal extending below the pivot 25. The piston rod extends through an enlarged hole in the end of the pedal and to a point beyond for a purpose to be later referred to.

The conduits 10 and 11 which place the master cylinder in communication with the fluid motor of the right-hand brake assembly have interposed therebetween a shut-off valve 26 and also interposed between the conduits 13 and 14 leading to the fluid motor of the left-hand brake is another shut-off valve 27. Both of these valves are of like construction and as shown in Figure 2 each comprises a casing 28 provided with chambers 29 and 30 connected together by a passage 31. A valve seat 32 is associated with passage 31 and cooperating with this seat is a valve 33 mounted on a valve stem 34. A spring 35 normally biases the valve toward seated position. The stem of the valve extends through passage 31 and is fluted to permit passage of fluid. Within the chamber 30 of the valve casing is a cross shaft 36 carrying a cam 37 for engaging the end of the stem to move the valve element off its seat. This shaft also carries a shoulder 38 for engaging the side of the stem to limit the rotation of the shaft in one direction. The outer end of the shaft carries an arm 39 for rotating it to control the vlave 33. The chamber 29 of the valve 26 is connected to conduit 11 coming from the master cylinder and the chamber 30 of the valve is connected to conduit 10 leading to the fluid motor of the right-hand brake assembly 1. Similarly the chamber 29 of valve 27 is connected to conduit 14 coming from the master cylinder and chamber 30 is connected to conduit 13 leading to the fluid motor of the left-hand brake assembly 3.

As shown in detail in Figure 4, the valve 26 is adapted to be controlled by a hand lever 40 which has its lower arm 41 connected to one end of a rod 42. The other end of this rod is operatively connected to the arm 39 of the valve through a spring 43, said spring being interposed between the adjustable nuts 44 on the end of the rod and a sleeve 45 receiving the rod and pivoted to the end of arm 39. The rod 42 also has fixed thereon a collar 46 which is adapted to engage a sleeve 47 slidable on the rod and pivotally connected to an arm 48 carried by a cross shaft 49. The collar 46 is so positioned on the rod that it will be spaced from the sleeve 47 when the lever 41 is in its inoperative position but will abut sleeve 45 and hold valve 33 open. A spring 50 maintains the lever in its inoperative position.

The shut-off valve 27 is adapted to be controlled by a second lever 51 which has its lower arm 52 connected to arm 39 of the valve 27 by the same structure previously described with respect to the connection between lever 40 and valve 26. This structure is designated by the same reference characters and need not be again described in detail. The connection between the cross shaft 49 and the rod 42 is by means of an arm 53 which is connected to the sleeve 47 in the same manner as that described with respect to arm 48 on the other end of the cross shaft. The lever 51 is held in inoperative position by a spring 54 which also holds the valve 27 open.

The cross shaft 49 is so positioned that it extends beneath the extended end of the piston rod 20 which as previously described actuates the piston of the master cylinder device. In order that this piston rod may be actuated by the cross shaft there is secured to the latter an arm 55 capable of abutting a collar 56 on the end of the piston rod, which extends through an enlarged opening in the end of the arm.

In operation both valves 26 and 27 are normally held open by the action of the springs 50 and 54 on the levers thus permitting fluid to flow in both directions through the valve. If it is desired to apply both brakes simultaneously the brake pedal can be operated and fluid under pressure will be simultaneously transmitted to both the fluid motors 9 of the two braking assemblies. Actuation of the piston rod by the pedal will not cause any movement of the cross shaft.

If it is desired to apply the right-hand brake only to assist in steering the vehicle lever 51 is pulled rearwardly. This will first cause valve 27 to be closed and then the collar 46 engaged with arm 53 on the cross shaft. Continued movement of the lever 51 rearward will then cause the arm 55 on the cross shaft to move the piston rod 20 and operate the master cylinder to develop fluid under pressure without operation of the brake pedal. Since the valve 27 is closed, fluid under pressure cannot be transmitted to the fluid motor of the left-hand brake but fluid under pressure can be transmitted to the fluid motor of the right-hand brake since the valve 26 remains open due to the sliding of sleeve 47 on the rod 42 as the arm 48 is moved with the cross shaft. It is thus seen that the right-hand wheel will be braked and held from movement and the left-hand wheel will remain free to rotate. Thus, if the steering wheel or wheels of the vehicle (not shown) have been turned to a position to steer the vehicle to the right a very short turn will be made since the vehicle will now turn around the braked wheel 2 as an axis.

If it is desired to turn the vehicle short to the left by braking the left-hand wheel, the left-hand lever 40 is grasped and pulled rearwardly. This will first cause valve 26 to be closed to prevent fluid pressure from being transmitted to the fluid motor of the right-hand brake and then the master cylinder device operated to apply the left-hand brake. Thus the left-hand wheel 4 will be braked and the right wheel permitted to rotate freely so the vehicle can be steered around the wheel 4 as a turning axis.

In mounting the braking system on the vehicle, the lever 40 is mounted within easy reach of the left hand of the operator and lever 51 is mounted within easy reach of the right-hand of the operator. Since the left-hand lever is employed to assist in steering to the left and the right-hand lever employed to assist in steering to the right, there will be no possibility of confusion in operating these levers.

By the use of the braking system described to assist in steering, a hand lever only needs to be operated thus leaving the foot free to be employed for other purposes. The only time that the brake pedal is employed is when it is desired to operate the two brakes simultaneously. The braking system is very well adapted for use on many types of vehicles for aiding in making short turns. Examples of the vehicles upon which it may be installed are farm tractors and airplanes.

Being aware of the possibility of modifications in the particular structure herein described without departing from the fundamental principles of my invention, I do not intend that its scope be limited except as set forth by the appended claims.

Having fully described my invention, what I claim as new and desire to secure by Letters Patent of the United States is:

1. In braking mechanism, two brakes, means for actuating both brakes simultaneously, means for disconnecting one brake so that it cannot be actuated by said first named means, and means controlled by the operation of a single member for successively operating the second named means and the first named means.

2. In a fluid pressure braking mechanism, two brakes, fluid pressure actuated means for applying the brakes simultaneously, and means controlled by a movement of a single control member for first so conditioning the fluid pressure actuated means that fluid pressure cannot be transmitted to actuate one of said brakes and then by an additional movement of said control member to cause subsequent operation of the fluid pressure actuated means to apply the other brake.

3. In a fluid pressure braking mechanism, two brakes each including an actuating fluid motor, a pressure producing means, conduit means for connecting the fluid motor of one brake to the pressure producing means, conduit means for connecting the fluid motor of the other brake to the pressure producing means, a shut-off valve for each conduit means, means for closing each shut-off valve independently of the other and means for operating the pressure producing means by either last named means after it has closed the shut-off valve it operates.

4. In a fluid pressure braking mechanism, two brakes each including an actuating fluid motor, a pressure producing means, conduit means for connecting the fluid motor of one brake to the pressure producing means, conduit means for connecting the fluid motor of the other brake to the pressure producing means, a shut-off valve for each conduit means, independently operable means for closing either shut-off valve, and means for causing the pressure producing means to be operated by each independently operable means after said means closes the shut-off valve controlled thereby.

5. In a fluid pressure braking mechanism, two brakes each including an actuating fluid motor, a pressure producing device, a manual member for actuating the device, conduit means for connecting the fluid motor of one brake to the pressure producing device, conduit means for connecting the fluid motor of the other brake to the pressure producing device, a shut-off valve for each conduit means, and means for closing either shut-off valve independently of the other and subsequently operating the pressure producing device without manual operation of the manual member.

6. In a fluid pressure braking mechanism, two brakes each including an actuating fluid motor, a pressure producing device, conduit means for connecting the fluid motor of one brake to the pressure producing device, conduit means for connecting the fluid motor of the other brake to the pressure producing device, a shut-off valve for each conduit means, a hand lever connected to close each valve, and an operative connection between each lever and the pressure producing device for actuating the latter after said lever has closed the valve with which it is connected.

7. In a fluid pressure braking mechanism, two brakes each including an actuating fluid motor, a pressure producing device, a brake pedal for operating the device, conduit means for connecting the fluid motor of one brake to the pressure producing device, conduit means for connecting the fluid motor of the other brake to the pressure producing device, a shut-off valve for each conduit means, a hand lever connected to close each valve, and an operative connection between each lever and the pressure producing device for actuating the latter without manual operation of the pedal and after said lever has closed the valve with which it is connected.

8. In a fluid pressure braking mechanism, two brakes each including an actuating fluid motor, a master cylinder device, a brake pedal for operating the master cylinder, conduit means for connecting the fluid motor of one brake to the master cylinder, conduit means for connecting the fluid motor of the other brake to the master cylinder, a shut-off valve for each conduit means, a shaft operatively connected to actuate the master cylinder independently of the pedal, a hand lever associated with each valve, and connecting means between each hand lever, its associated valve and the shaft for causing said valve to be closed and then the shaft to be subsequently operated to actuate the master cylinder without closing the other valve.

9. In a fluid pressure braking mechanism, two brakes each including an actuating fluid motor, a master cylinder device, a brake pedal for operating the master cylinder, conduit means for connecting the fluid motor of one brake to the master cylinder, conduit means for connecting the fluid motor of the other brake to the master cylinder, a shut-off valve for each conduit means, a shaft operatively connected to actuate the master cylinder independently of the pedal, a hand lever associated with each valve, and an operative connection between each hand lever, its associated valve and the shaft, said connection comprising a lost motion permitting closing of the valve by its lever prior to rotation of the shaft, said connections also embodying means permitting one lever to rotate the shaft without movement of the other lever.

10. In fluid pressure actuating mechanism, two fluid motors, a manually-controlled source of pressure, conduit means for connecting the source to the two fluid motors, two valves associated with the conduit means and each preventing fluid pressure from the source from actuating a fluid motor, manually-controlled independently operated means for closing each valve, and means operated by either last named means for causing said source of pressure to apply fluid pressure to the fluid motor connected thereto after the associated valve is closed to prevent the fluid motor it controls from being operated.

11. In fluid pressure actuating mechanism, two fluid motors, a manually-controlled source of pressure, conduit means for connecting the source to the two fluid motors, two valves associated with the conduit means and each preventing fluid pressure from the source from actuating a fluid motor, a lever for closing one valve, a second lever for closing the other valve, and means for connecting each lever to control the source of pressure after said lever closes its associated valve.

ARTHUR N. MILSTER.